US012059640B2

(12) United States Patent
Fleming et al.

(10) Patent No.: US 12,059,640 B2
(45) Date of Patent: Aug. 13, 2024

(54) METHOD AND SYSTEM FOR ORIFICE CONTROL OF VALVE PRESSURE DROP

(71) Applicant: Sulzer Management AG, Winterthur (CH)

(72) Inventors: Phillip Bradley Fleming, Keller, TX (US); Larry W. Burton, Waxahachie, TX (US); Michael J. Binkley, Glenn Heights, TX (US)

(73) Assignee: SULZER MANAGEMENT AG, Winterthur (CH)

( * ) Notice: Subject to any disclaimer, the term of this patent is extended or adjusted under 35 U.S.C. 154(b) by 327 days.

(21) Appl. No.: 17/327,971

(22) Filed: May 24, 2021

(65) Prior Publication Data

US 2021/0299589 A1 Sep. 30, 2021

Related U.S. Application Data

(63) Continuation-in-part of application No. 15/881,204, filed on Jan. 26, 2018, which is a continuation-in-part of application No. 14/822,637, filed on Aug. 10, 2015, now abandoned.

(60) Provisional application No. 62/484,688, filed on Apr. 12, 2017, provisional application No. 62/451,400, filed on Jan. 27, 2017, provisional application No. 62/035,856, filed on Aug. 11, 2014.

(51) Int. Cl.
*B01D 3/16* (2006.01)
*B01D 3/20* (2006.01)
*B01D 3/32* (2006.01)

(52) U.S. Cl.
CPC ............. *B01D 3/163* (2013.01); *B01D 3/205* (2013.01); *B01D 3/324* (2013.01)

(58) Field of Classification Search
CPC ......... B01D 3/163; B01D 3/205; B01D 3/324
See application file for complete search history.

(56) References Cited

U.S. PATENT DOCUMENTS 2,428,889 A * 10/1947 Nutter .................... B01D 3/205
261/109
2,710,177 A *  6/1955 Young .................... B01D 3/163
261/114.5
2,772,080 A * 11/1956 Huggins ................ B01D 3/163
261/114.1

(Continued)

FOREIGN PATENT DOCUMENTS

BE         588 502 A       7/1960
WO   2011/141301 A2      11/2011
WO   2016/051372 A1       4/2016

OTHER PUBLICATIONS

Lockett, M.J., Distillation Tray Fundamentals, Cambridge University Press, 1986.

(Continued)

*Primary Examiner* — Stephen Hobson
(74) *Attorney, Agent, or Firm* — GLOBAL IP COUNSELORS, LLP (57) ABSTRACT

The present disclosure relates to a valve tray for use in a chemical process column. The valve tray includes a plurality of apertures formed therein. A plurality of valves are maintained in a spaced relationship relative to individual apertures of the plurality of apertures. An area of the individual apertures is less than an area of individual valves of the plurality of valves.

20 Claims, 8 Drawing Sheets

(56) References Cited

U.S. PATENT DOCUMENTS

| | | | | |
|---|---|---|---|---|
| 2,819,050 A | * | 1/1958 | Huggins | F16K 15/00 137/533.19 |
| 2,979,316 A | * | 4/1961 | Houston, Jr. | B01D 3/163 137/513.5 |
| 3,013,782 A | * | 12/1961 | Glitsch | B01D 3/205 137/513.5 |
| 3,019,003 A | * | 1/1962 | Glitsch | B01D 3/163 137/513.5 |
| 3,029,070 A | * | 4/1962 | Koch | B01D 3/163 202/158 |
| 3,037,754 A | * | 6/1962 | Glitsch | F16K 15/02 261/114.1 |
| 3,056,592 A | * | 10/1962 | Thrift | B01D 3/163 261/114.1 |
| 3,080,155 A | * | 3/1963 | Glitsch | F16K 24/04 137/513.5 |
| 3,087,711 A | * | 4/1963 | Glitsch | B01D 3/163 261/114.1 |
| 3,143,582 A | * | 8/1964 | Jones | B01D 3/163 137/332 |
| 3,146,280 A | * | 8/1964 | Forgrieve | B01D 3/163 261/114.1 |
| 3,173,972 A | * | 3/1965 | Van't Sant | F16K 15/02 137/513.5 |
| 3,210,056 A | * | 10/1965 | Van't Sant | B01D 3/163 137/513.5 |
| 3,215,414 A | * | 11/1965 | Van't Sant | B01D 3/163 137/513.5 |
| 3,245,669 A | * | 4/1966 | Huggins | F16K 15/02 261/114.1 |
| 3,287,004 A | * | 11/1966 | Nutter | B01D 3/163 261/114.1 |
| 3,333,836 A | * | 8/1967 | Bahout | B01D 3/163 137/513.5 |
| 3,399,871 A | * | 9/1968 | Bon | F16K 15/08 261/114.1 |
| 3,602,253 A | * | 8/1971 | Bahout | B01D 3/163 137/513.5 |
| 3,618,912 A | * | 11/1971 | Braun | F28C 3/06 137/533.17 |
| 3,770,255 A | * | 11/1973 | Nutter | B01D 3/163 261/114.4 |
| 3,815,880 A | * | 6/1974 | Price | B01D 3/163 261/114.4 |
| 3,862,281 A | * | 1/1975 | Uchiyama | B01D 3/163 137/512.1 |
| 3,940,462 A | * | 2/1976 | Braun | B01D 3/163 261/114.4 |
| 4,105,723 A | * | 8/1978 | Mix | B01D 3/32 261/109 |
| 4,597,916 A | * | 7/1986 | Chen | F28F 25/08 428/596 |
| 5,120,474 A | * | 6/1992 | Binkley | B01D 3/20 261/114.4 |
| 5,164,125 A | * | 11/1992 | Binkley | B01D 3/22 261/114.1 |
| 5,480,595 A | * | 1/1996 | Yeoman | B01D 3/163 261/114.1 |
| 5,547,617 A | * | 8/1996 | Lee | B01D 3/326 261/114.5 |
| 5,632,935 A | * | 5/1997 | Yeoman | B01D 3/22 261/114.1 |
| 5,762,834 A | * | 6/1998 | Hauser | B01D 3/163 261/114.3 |
| 6,053,485 A | * | 4/2000 | Pan | B01D 3/163 261/114.4 |
| 6,145,816 A | * | 11/2000 | Chuang | B01D 3/163 261/114.3 |
| 6,193,222 B1 | * | 2/2001 | Fan | B01D 3/163 29/896.6 |
| 6,799,752 B2 | * | 10/2004 | Wu | B01D 3/22 261/114.2 |
| 6,830,607 B2 | * | 12/2004 | Allen | B01D 3/20 261/114.5 |
| 7,540,477 B2 | * | 6/2009 | Fischer | F16K 15/023 261/114.4 |
| 8,430,380 B2 | * | 4/2013 | Binkley | B01D 3/163 261/114.5 |
| 8,720,870 B2 | * | 5/2014 | Pilling | B01D 3/205 261/114.4 |
| 8,876,088 B1 | * | 11/2014 | Binkley | B01D 3/163 261/114.4 |
| 9,072,986 B2 | * | 7/2015 | Kim | B23P 11/00 |
| 9,199,206 B2 | * | 12/2015 | Pilling | B01D 3/163 |
| 9,586,160 B2 | | 3/2017 | Binkley | |
| 9,597,650 B2 | * | 3/2017 | Buttridge | C10G 45/08 |
| 10,258,936 B2 | * | 4/2019 | Nieuwoudt | B01F 23/232312 |
| D898,165 S | * | 10/2020 | Nieuwoudt | D23/249 |
| 11,364,451 B2 | * | 6/2022 | Nieuwoudt | H04W 16/14 |
| 2002/0163091 A1 | * | 11/2002 | Wu | B01D 3/22 261/114.4 |
| 2005/0280169 A1 | * | 12/2005 | Yao | B01D 3/163 261/114.5 |
| 2007/0023938 A1 | * | 2/2007 | Fischer | B01D 3/163 261/114.4 |
| 2007/0227595 A1 | * | 10/2007 | Zhang | B01D 3/20 137/436 |
| 2008/0018003 A1 | * | 1/2008 | Pilling | B01D 3/163 261/114.3 |
| 2008/0277260 A1 | * | 11/2008 | Binkley | B01D 3/324 202/160 |
| 2009/0115079 A1 | * | 5/2009 | Trompiz | B01D 3/163 261/114.5 |
| 2009/0134533 A1 | * | 5/2009 | Griepsma | B01D 3/163 261/114.4 |
| 2010/0288624 A1 | * | 11/2010 | Kim | B01D 3/324 261/114.5 |
| 2011/0278745 A1 | * | 11/2011 | Pilling | B01D 3/163 261/114.4 |
| 2013/0062793 A1 | * | 3/2013 | Pilling | B01F 23/232312 261/114.5 |
| 2016/0193542 A1 | * | 7/2016 | Buttridge | B01D 3/163 203/99 |
| 2017/0007971 A1 | * | 1/2017 | Nieuwoudt | B01F 23/232312 |
| 2019/0192991 A1 | * | 6/2019 | Nieuwoudt | H04W 24/08 |

OTHER PUBLICATIONS

Extended European Search Report issued Feb. 2, 2021 in corresponding European Patent Application No. 18744141.5.

* cited by examiner

METHOD AND SYSTEM FOR ORIFICE CONTROL OF VALVE PRESSURE DROP

CROSS-REFERENCE TO RELATED APPLICATIONS

This application is a continuation-in-part application of U.S. patent application Ser. No. 15/881,204, filed on Jan. 26, 2018. U.S. patent application Ser. No. 15/881,204 is a continuation-in-part application of U.S. patent application Ser. No. 14/822,637, filed on Aug. 10, 2015.

BACKGROUND

Field of the Invention

The present disclosure relates to fluid-fluid contacting trays. In particular, the present disclosure relates to an improved fluid dispersion device and tray assembly incorporating fixed valves including "snap-in" field replacement valve configurations for use in conjunction with an array of tray deck orifices of having a selectively reduced size.

Background Information

This section provides background information to facilitate a better understanding of the various aspects of the disclosure. It should be understood that the statements in this section of this document are to be read in this light, and not as admissions of prior art.

It is well known to utilize distillation columns to separate selected components from a multicomponent stream. Generally, such contact columns utilize either trays, packing, or combinations thereof. Successful fractionation in the column is dependent upon intimate contact between heavier fluids, such as liquid, and lighter fluids, such as gas or vapor. Some contact devices, such as trays, are characterized by relatively high pressure drop and relatively high fluid hold-up. One type of contact apparatus utilizes fluid in the vapor phase to contact fluid in the liquid phase and has become popular for certain applications. Another type of contact apparatus is high-efficiency packing, which is energy efficient because it has low pressure drop and low fluid hold-up. However, these very properties at times make columns equipped with structured packing difficult to operate in a stable, consistent manner. Moreover, many applications simply require the use of trays.

Trays for fractionation columns are commonly designed in two general configurations: cross-flow and counter flow. Trays generally consist of a solid tray or deck having a plurality of apertures and are installed on support rings within the column. In cross-flow trays, lighter fluid, such as gas or vapor, ascends through the apertures and contacts heavier fluid, such as liquid, moving across the tray, through the "active" area thereof. In this area, the heavier fluid and the lighter fluid mix and fractionation occurs. The heavier fluid is directed onto the tray by means of a vertical channel from the tray above. This channel is referred to as the Inlet Downcomer. The heavier fluid moves across the tray and exits through a similar channel referred to as the Exit Downcomer. The location of the downcomers determines the flow pattern of the heavier fluid. If there are two Inlet Downcomers and the heavier fluid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) flow rate increases. It is the active area of the tray, however, which is of concern.

SUMMARY

Addressing now select flow designs, it has been discovered that a particularly effective tray in process columns is the sieve tray. This type of tray is constructed with a large number of apertures formed in the bottom surface, permitting the ascending lighter fluid to flow into direct engagement with the heavier fluid that is flowing across the tray from the downcomer described above. When there is sufficient lighter-fluid flow upwardly through the tray, the heavier fluid is prevented from running downwardly through the apertures (referred to as "weeping"). A small degree of weeping is normal in trays while a larger degree of weeping is detrimental to the capacity and efficiency of a tray.

It has also been discovered that tray efficiency is improved in sieve type trays by increasing the froth height of the heavier fluid and reducing the backflow of the heavier fluid flowing across the tray. Froth is created when lighter fluid "bubbles" percolate upwardly through the heavier fluid flowing across the tray. The suspension of the lighter fluid, such as in particular gas or vapor, in the heavier fluid prolongs the fluid-fluid contact which enhances the efficiency of the process. The longer the froth is maintained and the higher the froth is established, the greater the fluid-fluid retention. Higher froth requires smaller "bubbles" formed at a sufficiently slow rate. Likewise, backflow occurs beneath the froth when circulating currents of heavier fluid are established during the heavier fluid flow across the tray. This generally forms along the lateral portions thereof. These currents carry the heavier fluid back across the tray in a manner that reduces the concentration-difference driving force for mass transfer. It is the concentration-difference between the lighter fluid and the heavier fluid which enhances the effectiveness of the fluid-fluid contact.

The concentration-difference between the lighter fluid and the heavier fluid can be effected in many ways; some reducing efficiency. For example, as operating pressure increases, the heavier fluid begins to absorb lighter fluid as it moves across a tray. This is above that normally dissolved in the heavier fluid and represents much larger amounts of lighter-fluid bubbles that are commingled or "entrained" with the heavier fluid. This lighter fluid is not firmly held and is released within the downcomer, and, in fact, the majority of said lighter fluid must be released otherwise the downcomer cannot accommodate the heavier fluid/lighter fluid mixture and will flood, thus preventing successful tower operation. This phenomena is generally deemed to occur when operating pressure is such as to produce a lighter fluid density above about 1.0 lbs/cu. ft. and typically amounts to about 10 to 20% of the lighter fluid by volume. For conventional trays, as shown below, the released lighter fluid must oppose the descending frothy lighter fluid/heavier fluid mixture flowing over the weir into the downcomer. In many cases, such opposition leads to poor tower operation and premature flooding.

A drawback of the commercially available valve trays is that their contact efficiency, i.e. the mixing efficiency of the lighter fluid, in particular gas or vapor, and the heaver fluid, in particular liquid, is in need of improvement. In view of this, the object underlying the present disclosure is to provide a valve tray for use in a chemical-process column having an improved contact efficiency.

The present disclosure in an embodiment relates to valve tray for use in a chemical-process column, the valve tray comprising:
- a tray surface having at least one aperture formed therein, the at least one aperture being of an aperture area;
- at least one fixed valve disposed on the tray surface in a spaced relationship relative to an aperture, the at least one fixed valve comprising:
- a central portion being spaced from the aperture and having a substantially round shape,
- a vane being formed around a circumference of the central portion, wherein the vane extends outwardly and downwardly from the central portion, wherein the vane is angled relative to a central portion of the valve at an angle of 11° to 79° from horizontal, and wherein the vane accounts for 5% to 50% of a diameter of the valve, and
- at least one leg extending downwardly from an edge of the vane, wherein the at least one leg supports the central portion and maintains the central portion in the spaced relationship with the aperture, wherein the aperture area is smaller than a surface area of the valve.

It has been found that by forming a circumferential vane around the circumference of the central portion of a fixed valve so as to extend outwardly and downwardly from the central portion, wherein the vane is angled relative to the central portion of the valve at an angle of 11° to 79° from horizontal, and wherein the vane accounts for 5% to 50% of the diameter of the valve, vapor ascending through the aperture of the tray surface is completely directly downwardly to the tray surface. Thereby, an intimate and complete mixing of the ascending vapor with the liquid flowing over the tray surface is achieved so that the mixing efficiency between the liquid and vapor is improved and thus the contact efficiency is increased.

In accordance with a preferred embodiment of the present disclosure, the at least one leg of the at least one fixed valve includes a retainer means, which secures the at least one leg to the tray deck.

For instance, the at least one leg may include as retainer means a retainer tab extending below the tray surface and being bent at its end being opposite to the vane, and wherein the tray deck includes at least one slot proximate to an aperture arranged so that the retainer tab engages the slot thereby securing the leg to the tray deck.

Alternatively, the at least one leg may include as retainer means a retainer tab extending below the tray surface and comprising a clip which may move outwards in the radial direction of the fixed valve, and wherein the tray deck includes at least one slot proximate to an aperture arranged so that the retainer tab engages the slot so that the clip snaps into the slot thereby securing the leg to the tray deck.

Still alternatively, the at least one leg may include as retainer means a retainer tab being formed at its end being opposite to the vane hooked, and wherein the tray deck includes at least one slot proximate to an aperture arranged so that the hooked end of the tap snaps into the slot thereby securing the leg to the tray deck.

In order to firmly and stably secure the fixed valve onto the tray surface, it is preferred that at least one fixed valve comprises two legs.

Preferably, the two legs of the at least one fixed valve are opposite to each other and parallel to a direction of flow of a heavier fluid across the tray. Thereby, it is achieved that the lighter fluid, after having been deflected downwards by the fixed valve, exits the fixed valve in a direction generally perpendicular to the flow of the heavier fluid. In this manner, intimate mixing and mass transfer between the heavier fluid and the lighter fluid is promoted.

The vane extends preferably around at least 70%, more preferably around at least 90%, even more preferably around at least 95% and most preferably around the entire circumference of the central portion of the fixed valve.

The central portion of the fixed valve has, in top view, a generally round and preferably circular shape. The central portion of the fixed valve may be, in side view, flat or domed.

In accordance with one preferred embodiment of the present disclosure, the vane of the at least one fixed valve is a continuous circumferential vane entirely enclosing the central portion of the at least one fixed valve. Continuous circumferential vane means in this connection that the vane has in the circumferential the same width and the same inclination angle with regard to the horizontal.

In accordance with an alternative embodiment of the present disclosure, the at least one fixed valve comprises two legs and the vane comprises four portions, namely two portions from which edges the two legs extend downwardly and two portions between the two portions from which edges the two legs extend downwardly. The two portions of the vane from which edges the two legs extend downwardly may be tilted with regard to the other two portions of the vane by up to 40°, preferably by up to 20° and more preferably by up to 10°. Also in this embodiment, it is preferred that the vane encloses all of the circumference of the central portion of the fixed valve, however, with a slightly different inclination angle.

In an embodiment of the present disclosure, the vane is angled relative to the central portion of the at least one valve at an angle of 11° to 79° from horizontal. Particularly good results are obtained, when the vane is angled relative to the central portion of the valve at an angle of 45° to 79° and more preferably of 56° to 79° from horizontal.

In another embodiment of the present invention, the vane accounts for 5% to 50% of the diameter of the at least one valve. Preferably, the vane accounts for 20% to 50% and more preferably 35% to 50% of the diameter of the at least one valve.

In an embodiment of the present disclosure, the vertical distance of the outer edge of the vane and an uppermost point of the central portion of the fixed valve is 1.0 to 2.0-times and more preferably 1.5 to 2.0-times the vertical distance of the outer edge of the vane and the tray surface.

Also, it is preferred that the vertical distance of the outer edge of the vane and an uppermost point of the central portion of the fixed valve is 1.0 to 2.0-times and more preferably 1.5 to 2.0-times the diameter of the outer edge of the vane.

Good results are in particular obtained when the overall area of the fixed valve is 1.5 to 4.0 times and preferably 2.0 to 2.5-times larger than an area of the aperture.

Preferably, the normal open area of the aperture is 67% to 37% of the surface area of the valve.

In a further development of the idea of the present invention it is proposed that the ratio of the width of the fixed valve to the width of the aperture is 1.25 to 2.2.

In another embodiment, the present disclosure relates to a fixed valve comprising:
- a central portion being spaced from an aperture and having a substantially round shape,
- a vane being formed around a circumference of the central portion, wherein the vane extends outwardly and downwardly from the central portion, wherein the vane is angled relative to a top portion of the valve at an angle of 11° to 79° from horizontal, and wherein the vane accounts for 5% to 50% of a diameter of the valve, and at least one leg extending downwardly from an edge of the vane, wherein the at least one leg supports the central portion and maintains the central portion in the spaced relationship with the aperture.

Preferably, the at least one leg includes a retainer tab extending below the tray surface and being bent at its end being opposite to the vane, and wherein the tray deck includes at least one slot proximate to an aperture arranged so that the retainer tab engages the slot thereby securing the leg to the tray deck.

Alternatively, the at least one leg may include a retainer tab extending below the tray surface and comprising a clip which may move outwards in the radial direction of the fixed valve, and wherein the tray deck includes at least one slot proximate to an aperture arranged so that the retainer tab engages the slot so that the clip snaps into the slot thereby securing the leg to the tray deck.

Still alternatively, the at least one leg may include a retainer tab being formed at its end being opposite to the vane hooked, and wherein the tray deck includes at least one slot proximate to an aperture arranged so that the hooked end of the tap snaps into the slot thereby securing the leg to the tray deck.

In accordance with a preferred embodiment of the present disclosure, the vane is a continuous circumferential vane entirely enclosing the central portion of the fixed valve.

Alternatively, the at least one fixed valve may comprise two legs, wherein the vane comprises four portions, namely two portions from which edges the two legs extend downwardly and two portions between the two portions from which edges the two legs extend downwardly, wherein the two portions of the vane from which edges the two legs extend downwardly are tilted with regard to the other two portions of the vane by up to 40°, preferably by up to 20° and more preferably by up to 10°.

Good results are in particular obtained, when the vertical distance of the outer edge of the vane and an uppermost point of the central portion of the fixed valve is 1.0 to 2.0-times and preferably 1.5 to 2.0-times the diameter of the outer edge of the vane.

In accordance with another embodiment, the present disclosure relates to a method of forming a valve tray for use in a chemical-process column, the method comprising: forming a tray surface having at least one aperture formed therein, the at least one aperture being of an aperture area, placing and securing a an aforementioned fixed valve on the tray surface.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
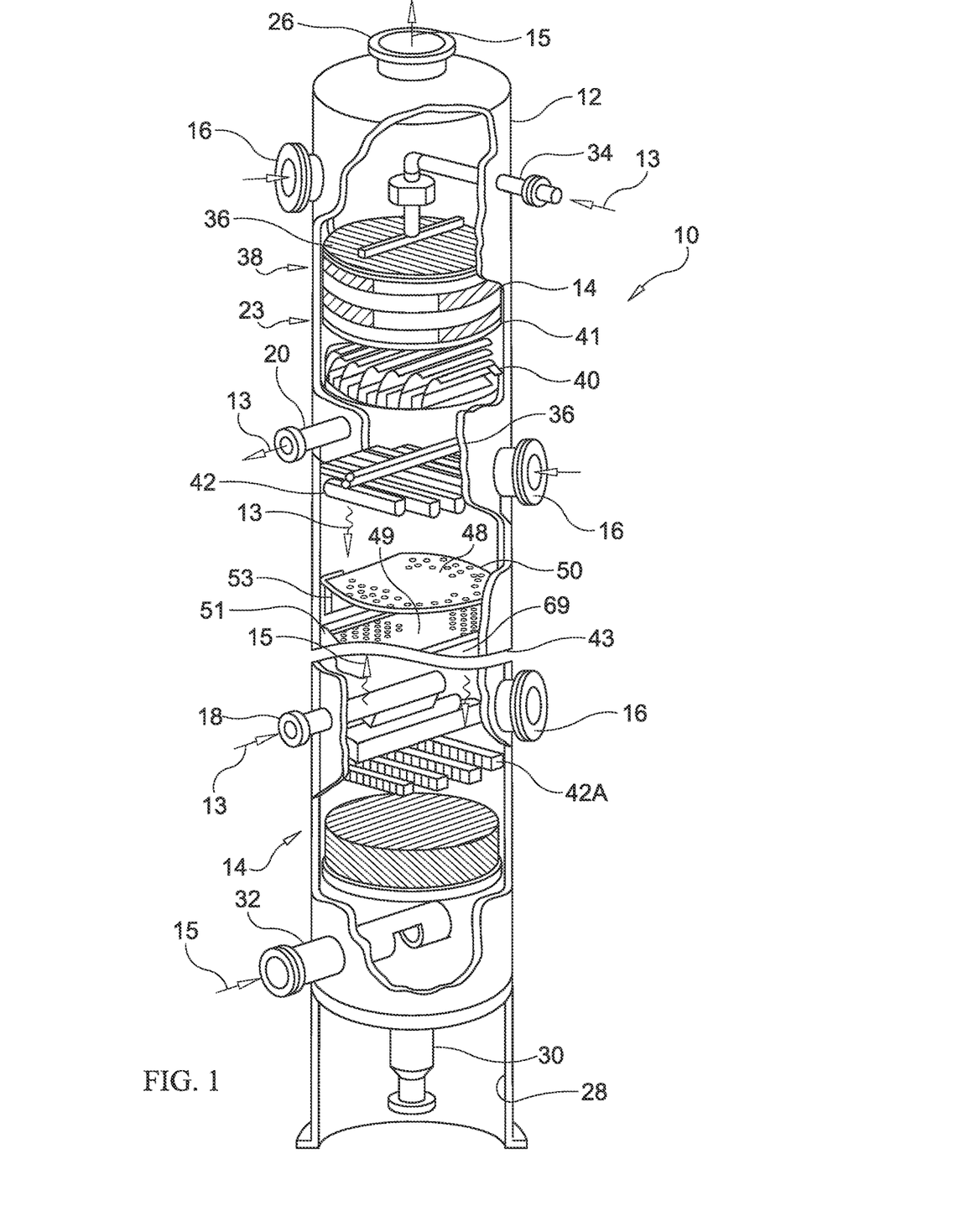
FIG. 1 is a perspective view of a packed column with various sections cut away for illustrating, diagrammatically, a variety of tower in accordance with an illustrative embodiment.

Referring first to FIG. 1, there is shown a fragmentary, perspective view of an illustrative packed exchange tower or column with various sections cut away for showing a variety of tower internals and the utilization of one embodiment of an improved high-capacity tray assembly. The exchange column 10 of FIG. 1 comprises a cylindrical tower 12 having a plurality of packing bed layers 14 and trays disposed therein. A plurality of manways 16 is likewise constructed for facilitating access to the internal region of the tower 12. Also provided are side stream draw-off line 20, heavier-fluid side feed line 18, and side stream lighter-fluid feed line or reboiler return line 32. A reflux return line 34 is provided atop the column 10.

In operation, heavier fluid 13 is fed into the column 10 through reflux return line 34 and side stream feed-input feed line 18. The heavier fluid 13 flows downwardly through the tower and ultimately leaves the tower either at side stream draw-off line 20, or at bottom-stream draw-off line 30. In the case of a vapor-liquid tower, the heavier fluid 13, during its downward flow, is depleted of some material which evaporates from it as it passes through the trays and packing beds, and is enriched or added to by material which condenses into it out of the lighter fluid stream.

Still referring to FIG. 1, the exchange column 10 is shown diagrammatically cut in half for purposes of clarity. In this illustration, the column 10 includes a lighter-fluid outlet in overhead line 26 disposed atop the tower 12 and a lower skirt 28 disposed in the lower region of the tower 12 around bottom stream takeoff line 30 coupled to a reboiler (not shown). Reboiler return conduit 32 is shown disposed above the skirt 28 for recycling lighter fluid 15 therein upwardly through the trays and/or packing layers 14. Reflux from condensers is provided in the upper tower region 23 through entry conduit 34 wherein reflux is distributed throughout a distributor 36 across upper packing bed 38. It may be seen that the upper packing bed 38 is of the structured packing variety. The regions of the exchange column 10 beneath the upper packing bed 38 are shown for the purpose of illustration and include a heavier fluid collector 40 disposed beneath a support grid 41 in support of the upper structured packing 38. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Valve trays, comprising the subject matter of the present disclosure, are herein shown. Such trays comprise plates which are punched or slotted in construction. Within the scope of the disclosure and for the purposes of the description of various embodiments herein, the configuration referred to as a "valve" or "unit" includes anything at the intersection of and facilitating the dispersion contact between a lighter fluid 15 and a heavier fluid 13. The lighter fluid 15 and the heavier fluid 13 engage at or along the tray. Optimally, the lighter-fluid 15 and heavier-fluid 13 flows reach a level of stability. With the utilization of appropriate downcomers, to be described in more detail below, this stability may be achieved with a relatively low flow rate permitting the ascending lighter fluid 15 to mix with the descending heavier fluid 13. In some embodiments of sieve tray or fixed valve trays, no downcomers are used and the lighter fluid 15 and the heavier fluid 13 use the same openings, alternating as the respective pressures change.

In the present embodiment, cross-flow valve trays 48 and 49 and downcomers 53 and 69 are illustrated. Tray 48 is constructed with a plurality of valves. Tray 49 also illustrates a raised inlet section 51 beneath downcomer 53, which is substantially planar, formed with a plurality of apertures, and which may include a series of momentum deflector barriers, as will be described below. The raised inlet area is described in more detail in U.S. Pat. No. 4,956,127 (the '127 Patent). Corrosion is another consideration in designing packed towers and for the selection of the material, design, and the fabrication of the tower internals.

Figure 2:
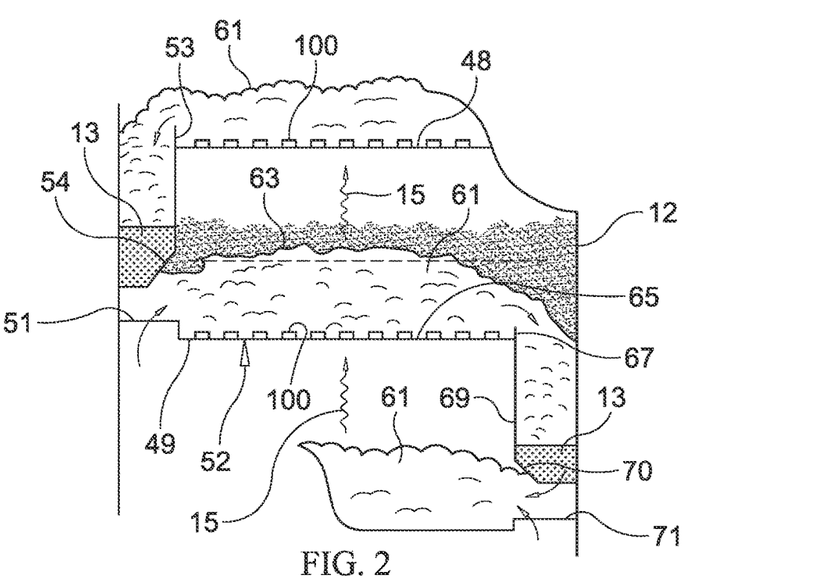
FIG. 2 is a diagrammatic, side-elevational, cross-sectional view of a downcomer-tray assembly secured within a process tower and illustrating the flow of heavier fluid and lighter fluid thereacross in accordance with an illustrative embodiment.

FIG. 2 illustrates a side-elevational, cross-sectional, diagrammatic view of the trays 48 and 49 of FIG. 1. An upper tray 48 comprises a first valved panel. The lower tray 49 is also of generally planar construction across its central active area 52, having a plurality of valves 100 mounted thereon, disposed therein, or formed therefrom as diagrammatically shown. Heavier fluid 13 travels down a downcomer 53 having a straight, sloped, tapered or mitered bottom section 54, from tray 48 disposed thereabove. The tapered section 54 of the downcomer provides a clearance angle for lighter fluid flow from the active inlet area, which clearance angle affords a horizontal flow vector to the lighter fluid vented through a flat or raised panel 51. The heavier fluid 13 engages lighter fluid 15 discharged from the active panel area 51 beneath the downcomer 53.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a lower region 70 where the heavier fluid accumulates and disperses upon active inlet region 71 thereebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present disclosure would also be applicable to multiple downcomer configurations, wherein the downcomers and raised, active inlet areas may be positioned in intermediate areas of the trays as also described below. By increasing the total active area of active inlet areas 51 and 71, greater capacity and efficiency is achieved. It is also the manner of flow of the heavier fluid 13 across the tray 49 which is critical to tray efficiency.

Figure 3:
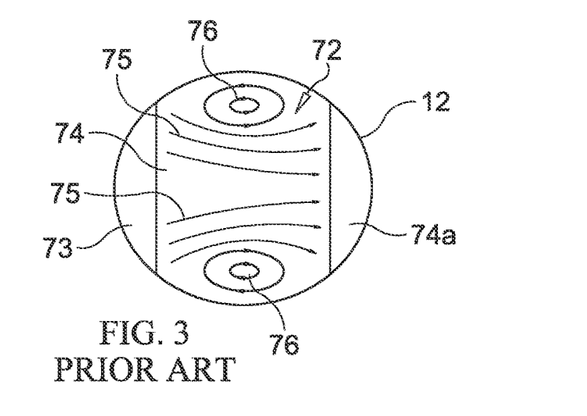
FIG. 3 is a top-plan, diagrammatic view of a tray illustrating efficiency problems with fluid flow transit in accordance with an illustrative embodiment.

FIG. 3 illustrates a flow diagram across a conventional tray. The prior art tray 72 is illustrated herein as a round unit having a first conventional downcomer for feeding heavier fluid upon an underlying panel 73 and then to the tray 74. A second downcomer 74A carries heavier fluid away from the tray. A plurality of arrows 75 illustrates the non-uniform flow of heavier fluid 13 typically observed across a conventional prior art tray which does not address the circulation issue. Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced '127 Patent.

Figure 4A:
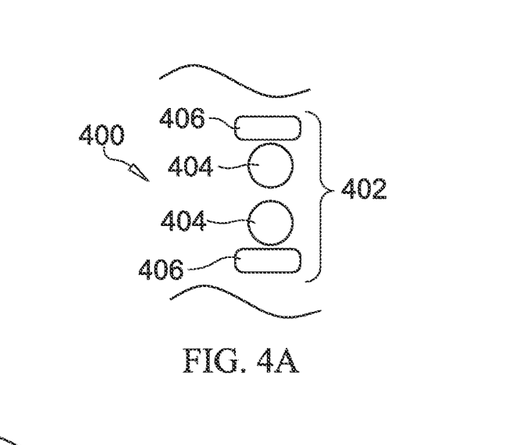
FIG. 4A is a top view of a tray orifice having a plurality of apertures according to an illustrative embodiment.

FIG. 4A is a top view of a tray orifice 402. The terms orifice and aperture are used in the present disclosure equivalently. In an embodiment, a valve tray 400 includes a plurality of orifices 402 formed therein. The plurality of orifices 402 includes a plurality of apertures 404 and two slots 406. In a typical embodiment, the plurality of apertures 404 includes two apertures each having a generally round shape; however, in other embodiments any number or shape of apertures could be utilized. In a typical embodiment, a valve (not shown) is secured to the tray 400 via the two slots 406. Vapor ascends upwardly through the plurality of apertures 404 for interaction and mass transfer with a second fluid on the a surface of the tray 400. In a typical embodiment, a combined area of the plurality of apertures 404 is less than a surface area of the valve (not shown). Thus, the two apertures restrict ascension of vapor upwardly through the tray 400. In a typical embodiment, a width of the valve is approximately 1.15 to approximately 2.0 times an open area associated with the plurality of apertures 404. That is, the open area of each aperture of the plurality of apertures 404 is approximately 87% to approximately 50% of the surface area of the valve.

Figure 4B:
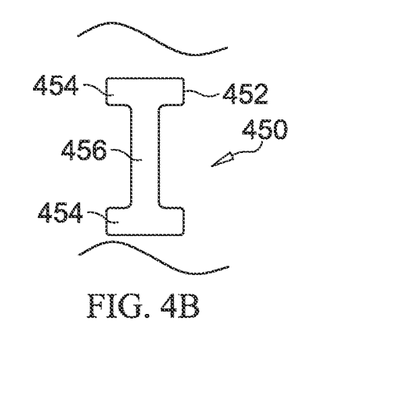
FIG. 4B is a top view of a tray orifice having restricted central portion according to an illustrative embodiment.

FIG. 4B is a top view of a tray orifice 452. In an embodiment, a tray 450 includes a plurality of orifices 452. The each orifice of the plurality of orifices 452 includes opposed ends 454 and a central portion 456. The opposed ends 454 have a greater lateral width than the central portion 456 thereby imparting a capital I shape to the plurality of orifices 454. In a typical embodiment, a valve (not shown) is secured in the opposed ends 454. Vapor ascends upwardly through the central portion 456 for interaction and mass transfer with a second fluid on the a surface of the tray 450. In a typical embodiment, an area of the central portion 456 is less than a surface area of the valve (not shown). In a typical embodiment, a width of the valve is approximately 1.15 to approximately 2.0 times greater than an open area associated with the central portion 456. That is the open area of each orifice of the plurality of orifices 452 is approximately 87% to approximately 50% of the surface area of the valve. Thus, the central portion restricts ascension of vapor upwardly through the tray 450.

Figure 4C:
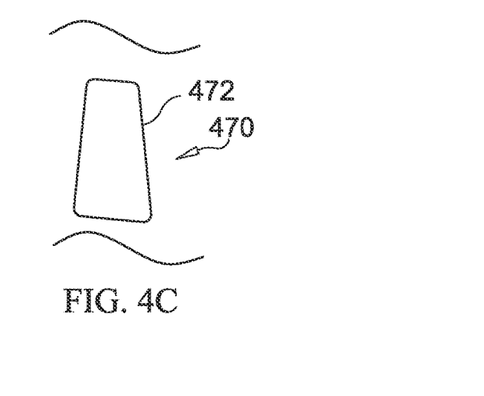
FIG. 4C is a top view of a trapezoidal tray orifice according to an illustrative embodiment.

FIG. 4C is a top view of a tray orifice 472. In an embodiment, a tray 470 includes a plurality of orifices 472. The plurality of orifices 472 have a generally trapezoidal shape. In a typical embodiment, a valve (not shown) is secured in a spaced relationship relative to the orifice 472. In a typical embodiment, a width of the valve is approximately 1.15 to approximately 2.0 times greater than an open area associated with the orifice 472. That is the open area of each orifice of the plurality of orifices 472 is approximately 87% to approximately 50% of the surface area of the valve.

Figure 5A:
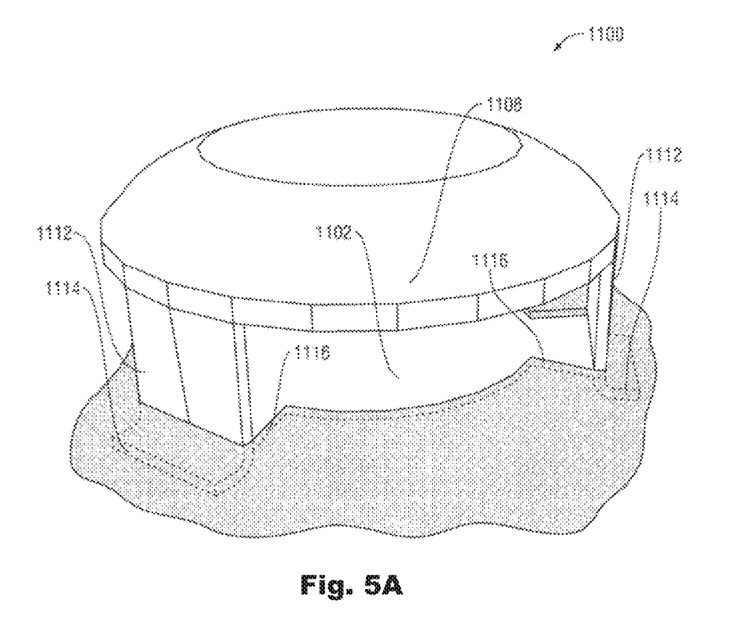
FIG. 5A is a perspective view of a domed valve according to an illustrative embodiment.

FIG. 5A is a perspective view of a valve 1100 in an embodiment. The valve 1100 is disposed in a spaced relationship relative to an orifice 1102 in a tray deck. The valve 1100 includes a central portion 1106, which central portion 1106 is spaced from the orifice 1102. As shown by way of example in FIG. 5A, the central portion 1106 exhibits a generally round shape; however, in other embodiments, valves utilizing principles of the disclosure may have central portions of any shape. A vane 1108 is formed around a circumference of the central portion 1106. In a typical embodiment, the vane 1108 is a continuous circumferential vane formed about the valve 1100. The vane 1108 extends outwardly and downwardly from the central portion 1106. In a typical embodiment, the vane 1108 accounts for approximately 5% to approximately 50% of the diameter of the valve 1100. At least one leg 1112 extends downwardly from an edge of the vane 1108. The at least one leg 1112 supports the central portion 1106, and maintains the central portion 1106 in the spaced relationship with the orifice 1102. The at least one leg 1112 includes a tab 1114. The tab 1114 engages a slot 1116 formed proximate to the orifice 1102. In a typical embodiment, the slot 1116 may be formed adjacent to the orifice 1102 or formed within the orifice 1102 as shown by way of example in FIG. 5A. In a typical embodiment, the at least one leg 1112 is a continuous extension of the vane 1108.

In traditional round valves, the retainer legs were formed downwards substantially within the cap edge causing gaps at the perimeter. Thus, the light fluid was channeled upwards at the openings rather than being directed downwards to sweep across the tray deck. This phenomenon reduces the effective vapor-liquid contact time and decreases effective mass transfer. In contrast, the valve 1100 includes an improved turning vane 1108 that directs during the operation all ascending vapor downwards onto the tray deck. By directing all vapor downwards towards the tray deck, contact mixing of vapor within the cross-flow liquid stream is improved. This encourages the ascending fluid to distribute across the tray deck and mix with heavier fluid moving laterally, thereby improving the contact efficiency. In a typical embodiment, the vane 1108 is angled relative to a top portion of the valve 1100 at an angle of approximately 11° to approximately 79° from horizontal. In a typical embodiment, an outer diameter of the valve 1100 ranges from approximately 152 mm to approximately 12 mm. During operation, the vane 1108 directs ascending fluid downwardly onto the tray deck thereby facilitating fluid interaction. In trapezoidal valves, there are advantages with respect to anti-fouling systems. For example, a directional vapor component creates a liquid-flow push across the tray at a minimum residence time. In contrast, the circular valve shape creates a natural balancing of vapor-liquid flow in omnidirectional paths. This results in an effective uniform mixing efficiency. Thus, each type of contacting valve has unique, positive attributes to be considered by a designer. Valves having directionally downward deflecting vanes are generally more efficient contacting devices that sieves or valves that lack a vena contracta component. Instead of the three legs 1112, the domed valve 1150 may have only two legs, which are preferably arranged opposite to each other and parallel to a direction of flow of a heavier fluid across the tray.

Still referring to FIG. 5A, the valve 1100 extends beyond the edges of the orifice 1102 in both a length-wise and a width-wise direction. Normally, the central portion 1106 has a surface area that is larger than an area of the orifice 1102. In a typical embodiment, the overall valve area is approximately 1.5 to approximately 4.0 times larger than an area of the orifice 1102. Normal open area of the orifice 1102 is approximately 67% to approximately 37% of the surface area of the valve 1100. The valve cover width to orifice width ratio may range from lower ratio of about 1.25 to a higher ratio of about 2.25. The preferred cap to orifice ratio, depending on the specifics of the application, is in the range of 1.6-2.6. Such an arrangement restricts passage of the lighter fluid ascending through the orifice 1102 and provides proper pressure drop control for design-range requirements. Such an arrangement also allows a larger escape area for ascending fluid thereby increasing capacity resulting from lower velocity escape and reduced spray heights. Chances of fouling are also reduced as a result of the larger escape area.

Figure 5B:
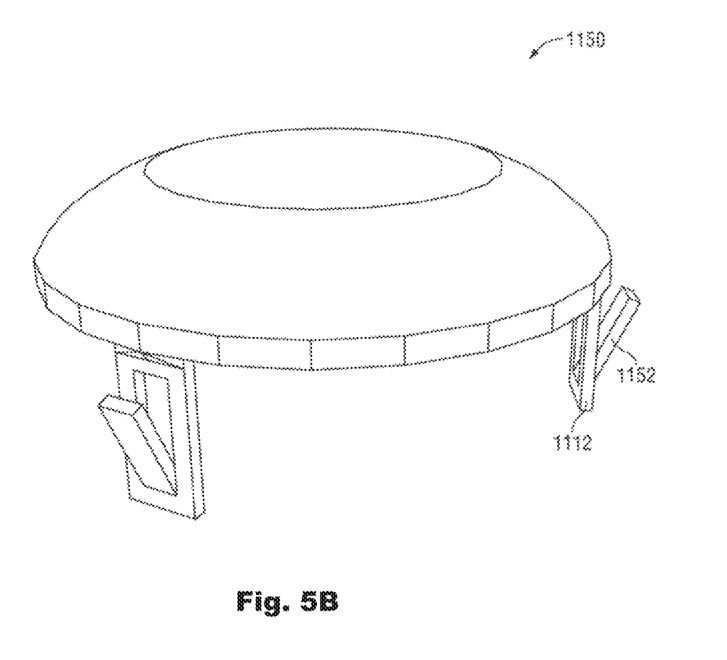
FIG. 5B is a perspective view of a domed valve having retainer clips according to an illustrative embodiment.

FIG. 5B is a perspective view of a valve 1150 in an embodiment. The valve 1150 includes a retainer clip 1152 disposed on each leg 1112 of the plurality of legs. In a typical embodiment, the retainer clip 1152 simplifies installation of the valve 1150 to the tray deck. In a typical embodiment, during installation of the valve 1150, each leg 1112 of the plurality of legs is inserted into a slot formed in the tray deck adjacent to the orifice. As the leg 1112 passes through the slot, the retainer clip 1152 compresses into the leg 1112. When the retainer clip 1152 passes through the slot to an underside of the tray deck, the retainer clip 1152 springs outwardly from the leg 1112 thereby securing the leg 1112 to the tray deck. Instead of the three legs 1112, the domed valve 1170 may have only two legs, which are preferably arranged opposite to each other and parallel to a direction of flow of a heavier fluid across the tray.

Figure 5C:
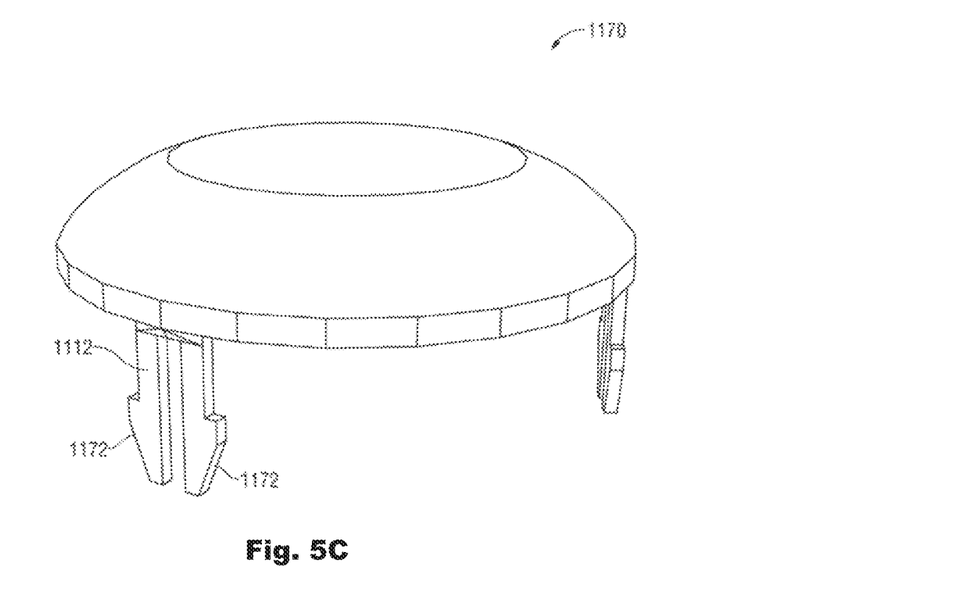
FIG. 5C is a perspective view of a domed valve having retainer tabs according to an illustrative embodiment.

FIG. 5C is a perspective view of a valve 1170 in an embodiment. The valve 1170 includes a retainer tab 1172 disposed on each leg 1112 of the plurality of legs. In a typical embodiment, the retainer tab 1172 simplifies installation of the valve 1170 to the tray deck. In a typical embodiment, during installation of the valve 1170, each leg 1112 of the plurality of legs is inserted into a slot formed in the tray deck. As the leg 1112 passes through the slot, the retainer tap 1172 snaps into the slot thereby securing the leg 1112 to the tray deck. Instead of the three legs 1112, the domed valve 1100 may have only two legs, which are preferably arranged opposite to each other and parallel to a direction of flow of a heavier fluid across the tray.

Figure 6:
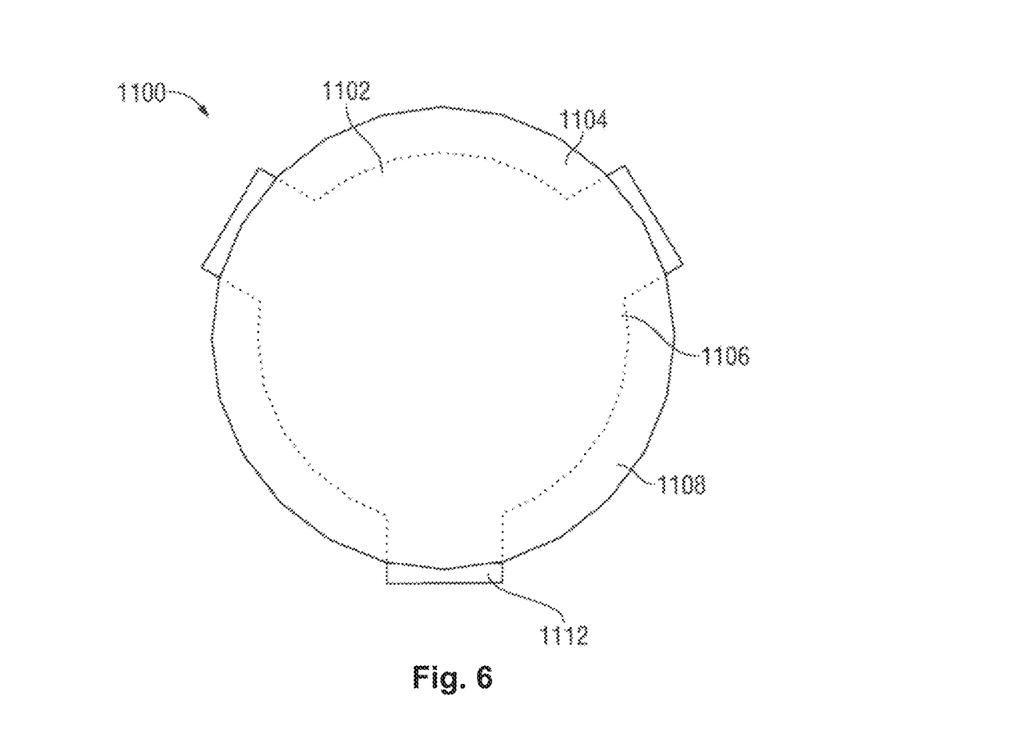
FIG. 6 is a top view of a domed valve showing a relative size of a valve orifice according to an illustrative embodiment.

FIG. 6 is a top view of the domed valve 1100 in an embodiment showing a relative size of a valve orifice. The valve 1100 is disposed in a spaced relationship relative to an orifice 1102 in a tray deck 1104. The valve 1100 includes a central portion 1106, which central portion 1106 is spaced from the orifice 1102. As shown by way of example in FIG. 5A, the central portion 1106 exhibits a generally round shape; however, in other embodiments, valves utilizing principles of the disclosure may have central portions of any shape. The at least one leg 1112 supports the central portion 1106 and maintains the central portion 1106 in the spaced relationship with the orifice 1102. In a typical embodiment, an area of the central portion 1106 ranges from approximately 1.05 to approximately 2.5 times larger than an open area of the orifice 1102. That is an open area of the orifice 1102 is approximately 67% to approximately 37% of the surface area of the valve 1100. In various embodiments, a secondary plate is secured to an underside of the tray deck 1104 beneath the orifice 1102. The secondary plate reduces a size of the orifice 1102 relative to the valve 1100 as noted above. A vane 1108 is formed on a circumference of the central portion 1106. The vane 1108 extends outwardly and downwardly from the central portion 1106. Instead of the three legs 1112, the domed valve 1100 may have only two legs, which are preferably arranged opposite to each other and parallel to a direction of flow of a heavier fluid across the tray.

Still referring to FIG. 6, the vane 1108 directs ascending fluid in a downward direction thereby creating a vena contracta between a lower edge of the vanes 1108 and the tray deck 1104. Such a phenomenon encourages the ascending fluid to distribute across the tray deck and mix with heavier fluid moving laterally, thereby reducing pressure drop across the valve 1100 and improving the contact efficiency.

Figure 7A:
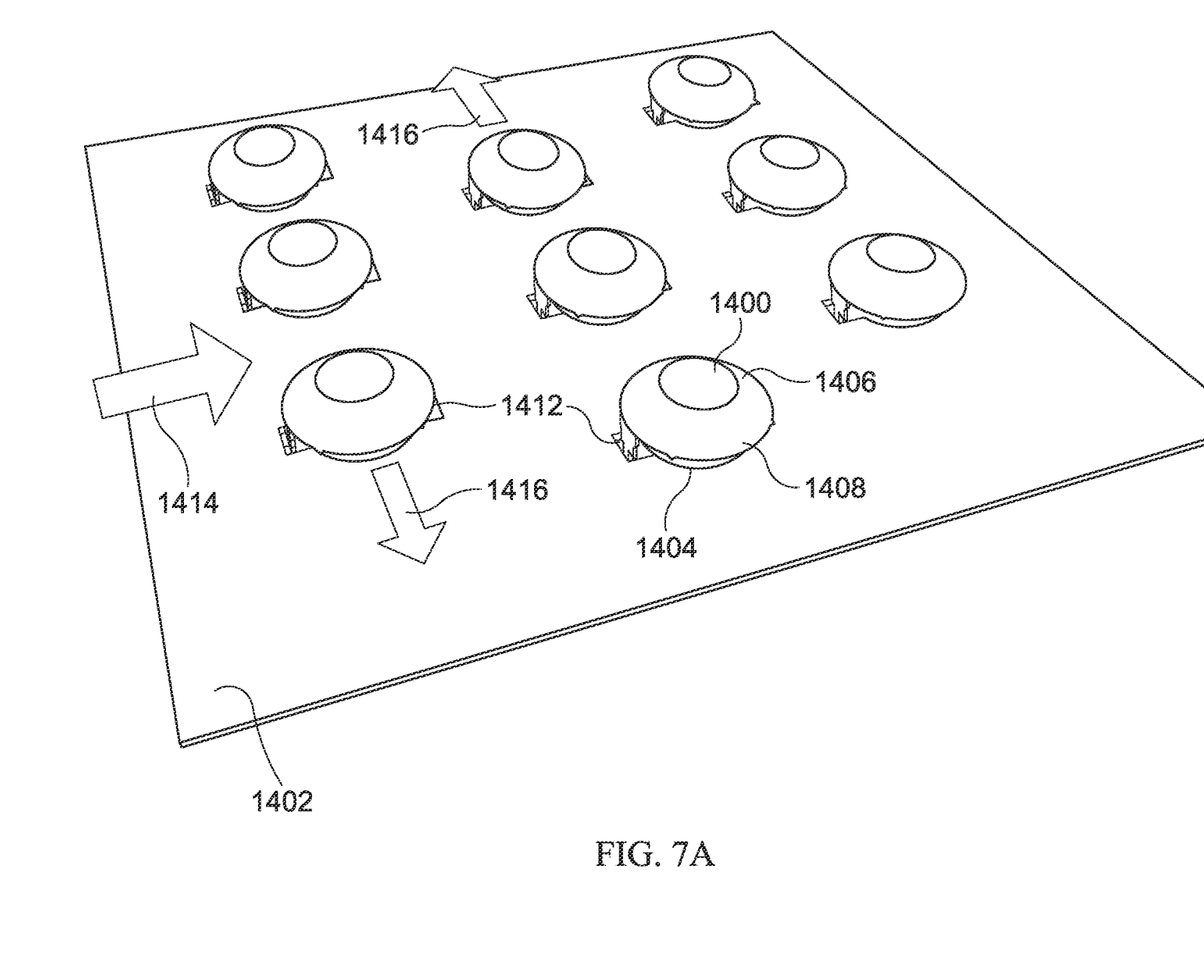
FIG. 7A is a top perspective view of a tray having a plurality of snap-in domed valves disposed therein according to an illustrative embodiment.

FIG. 7A is a top perspective view of a tray 1402 having a plurality of snap-in dome valves 1400 disposed therein in an embodiment. The tray 1402 includes a plurality of apertures 1404 formed therein to facilitate upward movement of fluids. Each valve 1400 is disposed proximate a corresponding aperture 1404. The valve 1400 includes a central portion 1406, which central portion 1406 is spaced from the aperture 1404. The central portion 1406 exhibits a generally round shape; however, in other embodiments, valves utilizing principles of the disclosure may have central portions of any shape such as, for example, rectangular or any other shape. At least one leg 1412 supports the central portion 1406 and maintains the central portion 1406 in the spaced relationship with the aperture 1404. In the embodiment illustrated in FIGS. 7A-B, the valve 1400 includes two legs 1412; however, in other embodiments, valves utilizing principles of the disclosure could utilize any number of legs. A vane 1408 is formed on a circumference of the central portion 1406. The vane 1408 extends outwardly and downwardly from the central portion 1406. In a typical embodiment, the vane 1408 directs ascending fluid in a downward direction thereby creating a vena contracta between a lower edge of the vane 1408 and the tray deck 1402. Such a phenomenon encourages the ascending fluid to distribute across the tray deck and mix with heavier fluid moving laterally, thereby reducing pressure drop across the valve 1400 and improving the contact efficiency.

Still referring to FIG. 7A, heavier fluid (illustrated by arrow 1414) flows across the tray 1402 in a direction generally aligned with the at least one leg 1412. The at least one leg 1412 disrupts flow of the heavier fluid 1414 around the aperture 1404 and the valve 1400. The at least one leg 1412 also causes ascending lighter fluid (illustrated by arrow 1416) to escape the valve 1400 in a direction generally perpendicular to the flow of the heavier fluid 1414. In this manner, intimate mixing and mass transfer between the heavier fluid 1414 and the lighter fluid 1416 is promoted.

Figure 7B:
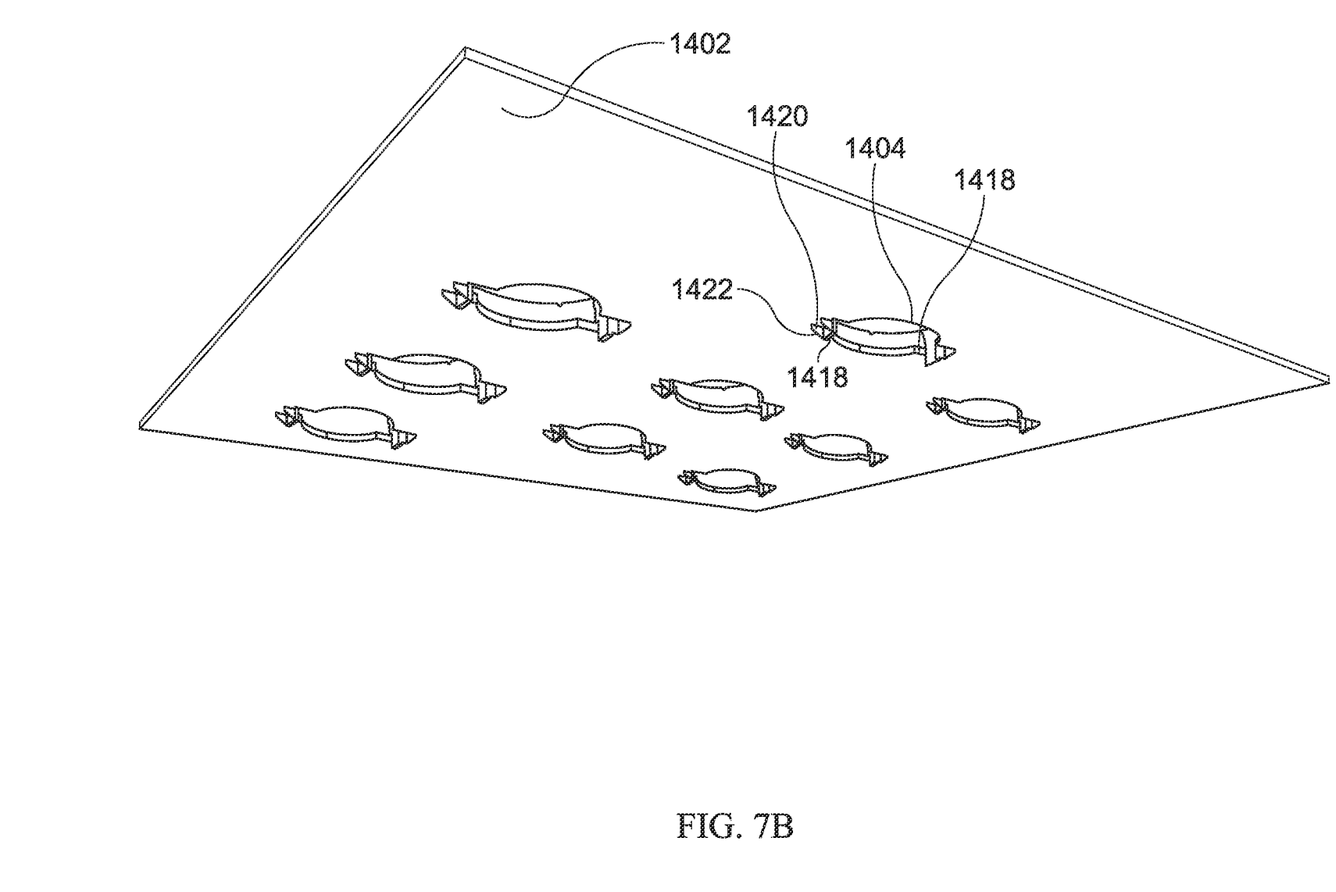
FIG. 7B is a bottom perspective view of the tray of FIG. 6 according to an illustrative embodiment

FIG. 7B is a bottom perspective view of the tray 1402 of FIG. 6. The apertures 1404 formed in in the tray 1402 include at least one notch 1418 formed therein. In the embodiment illustrated in FIG. 7B, the aperture includes two notches 1418; however, in a typical embodiment, the aperture 1404 includes a number of notches 1418 that corresponds to the number of legs 1412 present on the valve 1400. The leg 1412 is sized so as to be received into the notch 1418. At least one locking tab 1420 extends from the leg 1412 in a perpendicular direction. The at least one locking tab 1420 engages a bottom surface of the tray 1402 and prevents removal of the valve 1400 in an upward direction while allowing the valve 1400 to float vertically relative to the tray 1402.

Still referring to FIG. 7B, during installation, the valve 1400 is oriented with the aperture 1404 such that the legs 1412 align with the corresponding notches 1418. A beveled surface 1422 is formed on a lower aspect of the at least one locking tab 1420. The beveled surface 1422 contacts an upper surface of the tray 1402 and prevents the leg 1412 from being passively inserted into the notch 1418. A downward force is applied to the valve 1400 so as to press the valve 1400 into the aperture 1404. The beveled surface 1422 of the at least one leg 1412 slides against the upper surface of the tray 1402 and causes the leg 1412 to deflect inwardly. When an upper surface of the locking tab 1420 passes below the lower surface of the tray 1402, the spring properties of the leg 1412 cause the leg 1412 to return to its original position. The locking tab 1420 thereby secures the leg 1412 in the notch 1418 and prevents removal of the valve 1400 from the tray 1402 while allowing the valve 1400 to float vertically relative to the tray 1402.

Figure 8A:
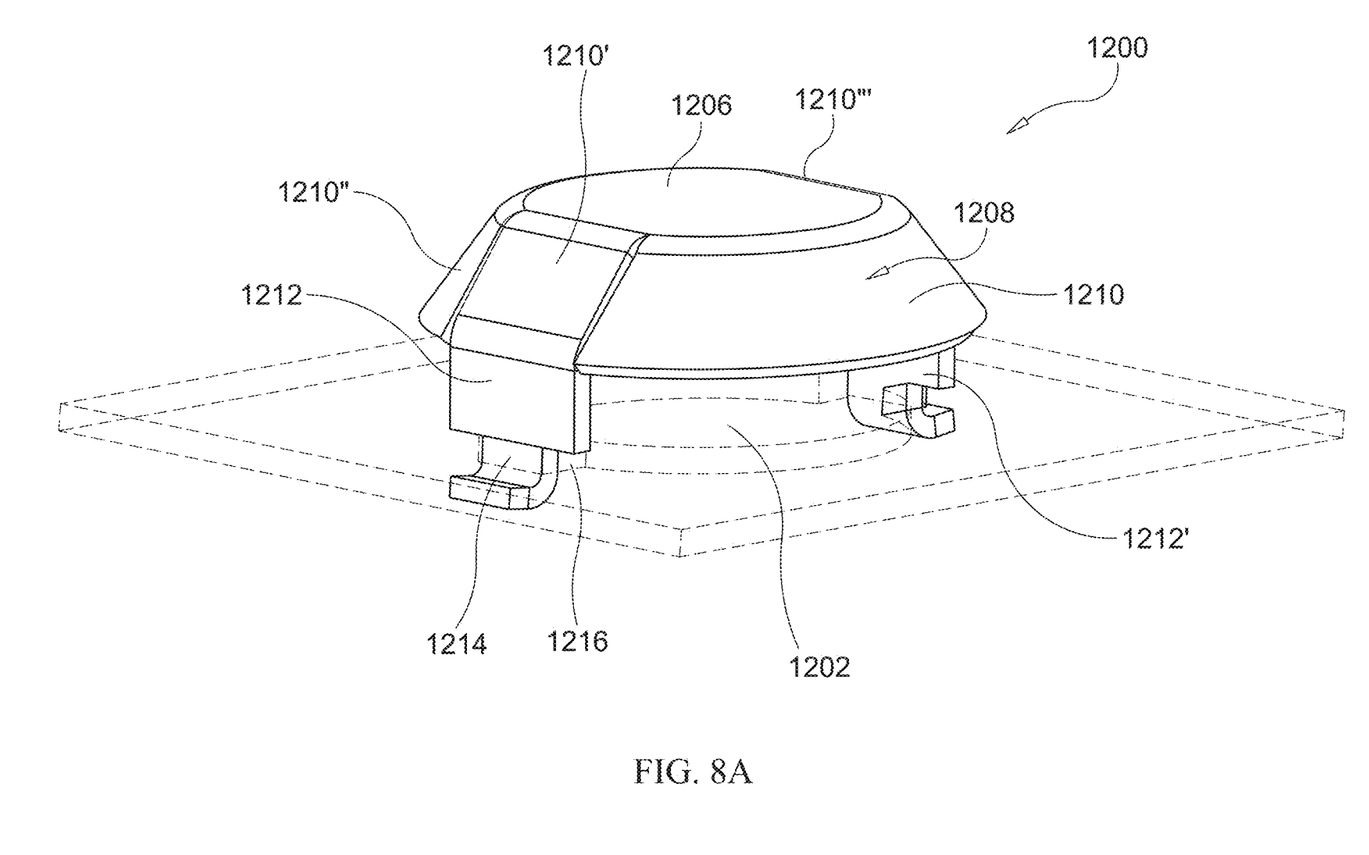
FIG. 8A is a perspective view of a valve having bent retainer tabs according to another illustrative embodiment.

FIG. 8A is a perspective view of a valve 1200 in an embodiment. The valve 1200 is disposed in a spaced relationship relative to an orifice 1202 in a tray deck. The valve 1200 includes a central portion 1206, which central portion 1206 is spaced from the orifice 1202. As shown by way of example in FIG. 8A, the central portion 1206 exhibits, in top view, a generally round shape; however, in other embodiments, valves utilizing principles of the disclosure may have central portions of any shape. A vane 1208 is formed around a circumference of the central portion 1206. In this embodiment, the valve 1200 comprises two legs 1212, 1212' and the vane 1208 comprises four portions 1210, 1210', 1210", 1210"' namely two portions 1210', 1210"' from which edges the two legs 1212, 1212' extend downwardly and two portions 1210, 1210" between the two portions 1210', 1210"' from which edges the two legs 1212, 1212' extend downwardly. The two portions 1210', 1210"' of the vane 1208 from which edges the two legs 1212, 1212' extend downwardly are slightly tilted with regard to the other two portions 1210, 1210" of the vane 1208. The vane 1208 encloses the entire circumference of the central portion 1206 of the valve 1200. The vane 1208 extends outwardly and downwardly from the central portion 1206. In a typical embodiment, the vane 1208 accounts for approximately 5% to approximately 50% of the diameter of the valve 1200. The two legs 1212, 1212' extends downwardly from each an edge of the vane 1208 and are arranged opposite two each other. The two legs 1212, 1212' support the central portion 1206, and maintain the central portion 1206 in the spaced relationship with the orifice 1202. The two legs 1212, 1212' each include a tab 1214. Each of the tabs 1214 engages a slot 1216 formed proximate to the orifice 1202. In a typical embodiment, the slot 1216 may be formed adjacent to the orifice 1202 or formed within the orifice 1202 as shown by way of example in FIG. 8A.

In traditional round valves, the retainer legs were formed downwards substantially within the cap edge causing gaps at the perimeter. Thus, the light fluid was channeled upwards at the openings rather than being directed downwards to sweep across the tray deck. This phenomenon reduces the effective vapor-liquid contact time and decreases effective mass transfer. In contrast, the valve 1200 includes an improved turning vane 1208 that directs during the operation all ascending vapor downwards onto the tray deck. By directing all vapor downwards towards the tray deck, contact mixing of vapor within the cross-flow liquid stream is improved. This encourages the ascending fluid to distribute across the tray deck and mix with heavier fluid moving laterally, thereby improving the contact efficiency. In a typical embodiment, the vane 1208 is angled relative to a top portion of the valve 1200 at an angle of approximately 11° to approximately 79° from horizontal. In a typical embodiment, an outer diameter of the valve 1200 ranges from approximately 152 mm to approximately 12 mm. During operation, the vane 1208 directs ascending fluid downwardly onto the tray deck thereby facilitating fluid interaction. In trapezoidal valves, there are advantages with respect to anti-fouling systems. For example, a directional vapor component creates a liquid-flow push across the tray at a minimum residence time. In contrast, the circular valve shape creates a natural balancing of vapor-liquid flow in omnidirectional paths. This results in an effective uniform mixing efficiency. Thus, each type of contacting valve has unique, positive attributes to be considered by a designer. Valves having directionally downward deflecting vanes are generally more efficient contacting devices that sieves or valves that lack a vena contracta component.

Still referring to FIG. 8A, the valve 1200 extends beyond the edges of the orifice 1202 in both a length-wise and a width-wise direction. Normally, the central portion 1206 has a surface area that is larger than an area of the orifice 1202. In a typical embodiment, the overall valve area is approximately 1.5 to approximately 4.0 times larger than an area of the orifice 1202. Normal open area of the orifice 1202 is approximately 67% to approximately 37% of the surface area of the valve 1200. The valve cover width to orifice width ratio may range from lower ratio of about 1.25 to a higher ratio of about 2.25. The preferred cap to orifice ratio, depending on the specifics of the application, is in the range of 1.6-2.6. Such an arrangement restricts passage of the lighter fluid ascending through the orifice 1202 and provides proper pressure drop control for design-range requirements. Such an arrangement also allows a larger escape area for ascending fluid thereby increasing capacity resulting from lower velocity escape and reduced spray heights. Chances of fouling are also reduced as a result of the larger escape area.

Figure 8B:
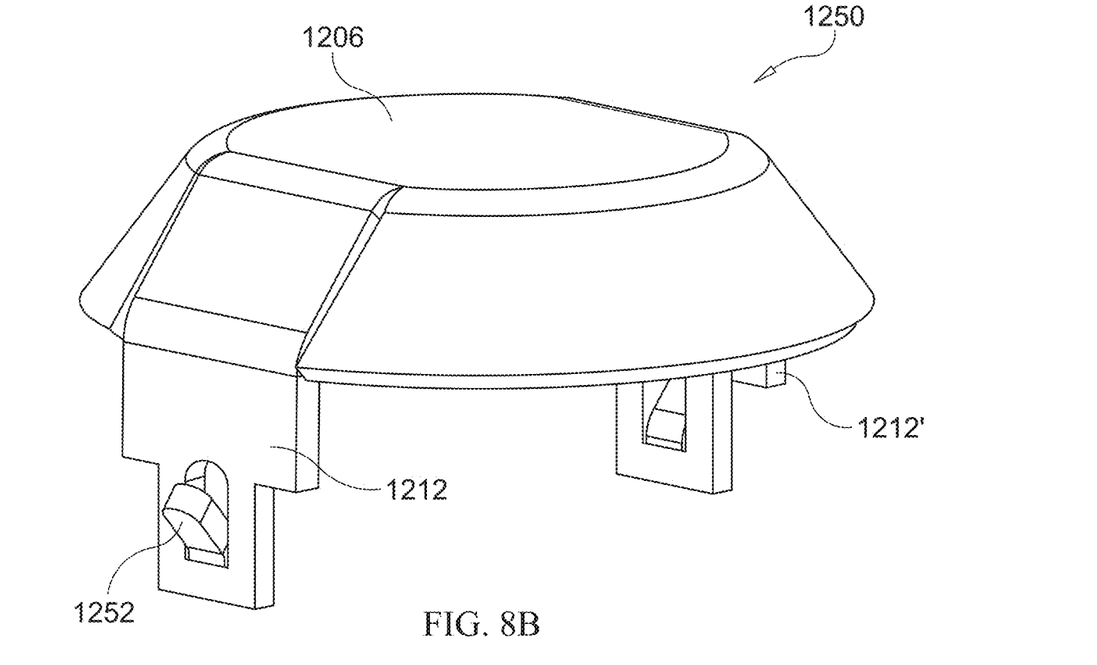
FIG. 8B is a perspective view of a valve having retainer clips according to an illustrative embodiment.

FIG. 8B is a perspective view of a valve 1250 in an embodiment. The valve 1250 is identical to that of FIG. 8A except for the retainer tabs. More specifically, the valve 1250 includes a retainer clip 1252 disposed on each of the two legs 1212, 1212'. In a typical embodiment, the retainer clip 1252 simplifies installation of the valve 1250 to the tray deck. In a typical embodiment, during installation of the valve 1250, each leg 1212, 1212' is inserted into a slot formed in the tray deck adjacent to the orifice. As the legs 1212, 1212' pass through the slots, the retainer clips 1252 compress into the legs 1212, 1212'. When the retainer clips 1252 pass through the slot to an underside of the tray deck, the retainer clips 1252 spring outwardly from the legs 1212, 1212' thereby securing the legs 1212, 1212' to the tray deck.

Figure 8C:
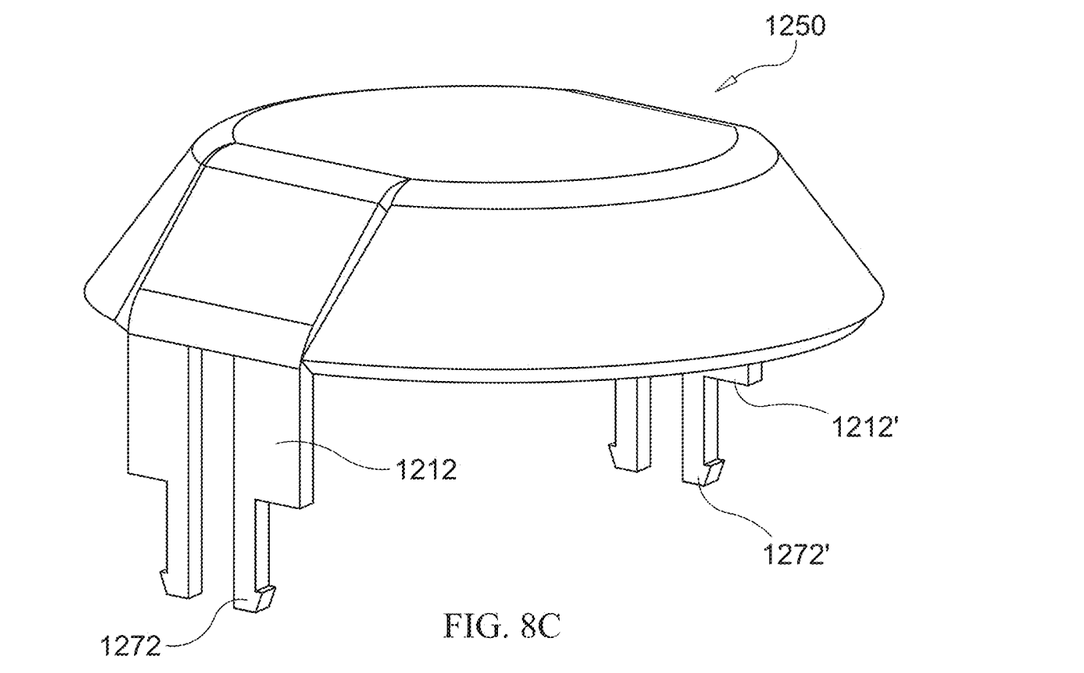
FIG. 8C is a perspective view of a valve having hooked retainer tabs according to an illustrative embodiment.

FIG. 8C is a perspective view of a valve 1270 in an embodiment. The valve 1270 is identical to that of FIG. 8A except for the retainer tabs. More specifically, the valve 1270 includes retainer tabs 1272, 1272' being formed at their ends being opposite to the vane 1270 hooked, with each of the retainer tabs 1272, 1272' disposed on a leg 1212, 1212'. In a typical embodiment, the retainer tabs 1272, 1272' simplify installation of the valve 1270 to the tray deck. In a typical embodiment, during installation of the valve 1270, each leg 1212, 1212' is inserted into a slot formed in the tray deck. As the legs 1212, 1212' pass through the slots, the retainer taps 1172 snaps into the slot thereby securing the leg 1112 to the tray deck.

What is claimed is:

1. A valve tray for use in a chemical-process column, the valve tray comprising:
   a tray surface having at least one aperture formed therein, the at least one aperture having an aperture area;
   at least one fixed valve disposed on the tray surface in a spaced relationship relative to the at least one aperture, the at least one fixed valve comprising:
   a central portion being spaced from the at least one aperture and having a substantially round shape,
   a vane being formed around a circumference of the central portion, wherein the vane extends outwardly and downwardly from the central portion, wherein the vane is angled from the central portion of the valve at an angle of 11° to 79° relative to a horizontal, and wherein the vane accounts for 20% to 50% of a diameter of the valve, and
   at least one leg extending downwardly from an edge of the vane, wherein the at least one leg supports the central portion and maintains the central portion in the spaced relationship with the at least one aperture,
   the aperture area being smaller than the surface area of the valve, and
   a vertical distance of an outer edge of the vane and an uppermost point of the central portion of the fixed valve being 1.0 to 2.0-times a vertical distance of the outer edge of the vane and the tray surface.

2. The valve tray of claim 1, wherein the at least one leg includes a retainer which secures the at least one leg to a tray deck of the valve tray.

3. The valve tray of claim 2, wherein the at least one leg includes a retainer tab extending below the tray surface and being bent at an end being opposite to the vane, and wherein the tray deck includes at least one slot proximate to an orifice arranged so that the retainer tab engages the slot thereby securing the leg to the tray deck.

4. The valve tray of claim 2, wherein the at least one leg includes a retainer tab extending below the tray surface and comprising a clip configured to move outwards in a radial direction of the fixed valve, and wherein the tray deck includes at least one slot proximate to an orifice arranged so that the retainer tab engages the slot so that the clip snaps into the slot thereby securing the leg to the tray deck.

5. The valve tray of claim 2, wherein the at least one leg includes a retainer tab having a hooked end at an end opposite to the vane, and wherein the tray deck includes at least one slot proximate to an orifice arranged so that the hooked end of the retainer tab snaps into the slot thereby securing the leg to the tray deck.

6. The valve tray of claim 1, wherein the at least one fixed valve comprises two legs.

7. The valve tray of claim 6, wherein the two legs are opposite to each other and parallel to a direction of flow of a heavier fluid across the tray.

8. The valve tray of claim 1, wherein the vane is a continuous circumferential vane entirely enclosing the central portion of the fixed valve.

9. The valve tray of claim 1, wherein the at least one fixed valve comprises two legs, wherein the vane comprises four portions including two portions from which edges the two legs extend downwardly and two portions between the two portions from which edges the two legs extend downwardly, wherein the two portions of the vane from which edges the two legs extend downwardly are tilted with regard to the two portions between the two portions from which edges the two legs extend downwardly by up to 40°.

10. The valve tray of claim 1, wherein an overall area of the fixed valve is 1.5 to 4.0 times larger than the at least one aperture.

11. The valve tray of claim 1, wherein an open area of the at least one aperture is 67% to 37% of the surface area of the valve.

12. The valve tray of claim 1, wherein a ratio of a width of the fixed valve to a width of the at least one aperture is 1.25 to 2.25.

13. A fixed valve comprising:
   a central portion being spaced from an aperture and having a substantially round shape,
   a vane being formed around a circumference of the central portion, wherein the vane extends outwardly and downwardly from the central portion, wherein the vane is angled from a top portion of the fixed valve at an angle of 11° to 79° relative to a horizontal, and wherein the vane accounts for 20% to 50% of a diameter of the fixed valve, and
   at least one leg extending downwardly from an edge of the vane, wherein the at least one leg supports the central portion and maintains the central portion in the spaced relationship with the aperture,
   a vertical distance of an outer edge of the vane and an uppermost point of the central portion of the fixed valve being 1.0 to 2.0-times a diameter of the outer edge of the vane.

14. The fixed valve of claim 13, wherein the at least one leg includes a retainer tab extending below a tray surface and being bent at an end being opposite to the vane, and wherein a tray deck includes at least one slot proximate to an aperture arranged so that the retainer tab engages the slot thereby securing the leg to the tray deck.

15. The fixed valve of claim 13, wherein the at least one leg includes a retainer tab extending below a tray surface and comprising a clip configured to move outwards in a radial direction of the fixed valve, and wherein the tray deck includes at least one slot proximate to an orifice arranged so that the retainer tab engages the slot so that the clip snaps into the slot thereby securing the leg to the tray deck.

16. The fixed valve of claim 13, wherein at least one leg includes a retainer tab being formed at an end being opposite to the vane hooked, and wherein a tray deck includes at least one slot proximate to an aperture arranged so that the hooked end of the tap snaps into the slot thereby securing the leg to the tray deck.

17. The fixed valve of claim 13, wherein the leg comprises two legs being opposite to each other.

18. The fixed valve claim 13, wherein the vane is a continuous circumferential vane entirely enclosing the central portion of the fixed valve.

19. The fixed valve of claim 13, wherein the at least one fixed valve comprises two legs, wherein the vane comprises four portions including two portions from which edges the two legs extend downwardly and two portions between the two portions from which edges the two legs extend downwardly, wherein the two portions of the vane from which edges the two legs extend downwardly are tilted with regard to the two portions between the two portions from which edges the two legs extend downwardly by up to 40°.

20. A method of forming a valve tray for use in a chemical-process column, the method comprising:
   forming a tray surface having at least one aperture formed therein, the at least one aperture being of an aperture area;
   placing and securing a fixed valve of claim 13 on the tray surface.

* * * * *